(12) United States Patent
Van Benthem et al.

(10) Patent No.: US 7,951,323 B2
(45) Date of Patent: May 31, 2011

(54) THERMOSETTING MATERIAL; PROCESS AND APPARATUS FOR FORMING THERMOSETTING MATERIAL

(76) Inventors: Rudolfus Antonius Theodorus Maria Van Benthem, Limbricht (NL); Jan Jacob Hendrik Nusselder, Sweikhuizen (NL); Hubertus Marie Christine Stijnen, Dilsen-Stokkem (BE)

( * ) Notice: Subject to any disclaimer, the term of this patent is extended or adjusted under 35 U.S.C. 154(b) by 1338 days.

(21) Appl. No.: 10/558,407

(22) PCT Filed: May 27, 2004

(86) PCT No.: PCT/NL2004/000384
§ 371 (c)(1),
(2), (4) Date: Nov. 28, 2005

(87) PCT Pub. No.: WO2004/106027
PCT Pub. Date: Dec. 9, 2004

(65) Prior Publication Data
US 2006/0261523 A1    Nov. 23, 2006

(30) Foreign Application Priority Data

May 28, 2003   (NL) .................................... 1023563

(51) Int. Cl.
*H05B 6/00* (2006.01)
(52) U.S. Cl. ........ 264/480; 264/481; 264/493; 264/479; 264/258
(58) Field of Classification Search .................. 264/481, 264/479, 480, 492, 493, 494, 496, 241; 425/3
See application file for complete search history.

(56) References Cited

U.S. PATENT DOCUMENTS

| 3,730,828 | A | | 5/1973 | Meiser | |
|---|---|---|---|---|---|
| 5,700,302 | A | * | 12/1997 | Stoetzel et al. | 51/295 |
| 5,832,362 | A | | 11/1998 | Trokhan | |
| 5,906,788 | A | * | 5/1999 | Boeckler | 264/492 |
| 6,106,761 | A | * | 8/2000 | Sjoberg et al. | 264/492 |
| 6,239,049 | B1 | * | 5/2001 | Follensbee et al. | 442/158 |
| 2003/0077394 | A1 | * | 4/2003 | Bradford et al. | 427/407.1 |
| 2003/0113476 | A1 | * | 6/2003 | Fredericksen et al. | 427/475 |

FOREIGN PATENT DOCUMENTS

| EP | 0 288 580 | | 11/1988 |
|---|---|---|---|
| GB | 2 381 495 | | 5/2003 |
| GB | 2381495 | A * | 5/2003 |

OTHER PUBLICATIONS

International Search Report.

* cited by examiner

*Primary Examiner* — Matthew J Daniels
*Assistant Examiner* — Yana Belyaev
(74) *Attorney, Agent, or Firm* — Nixon & Vanderhye P.C.

(57) ABSTRACT

The invention relate to a process for forming a cured, partially cured or uncured thermosetting material, comprising: an irradiation step wherein the thermosetting material is exposed to electromagnetic radiation which to a significant extent is within the neat-infrared range in such a way that the temperature of the irradiated thermosetting material is brought to between 40° C. and 400° C., and a forming step wherein the irradiated thermosetting material is brought into a desired shape, whereby the forming step is executed during and/or subsequent to the irradiation step. The invention also relates to an apparatus for carrying out the said process and to a thermosetting material.

28 Claims, No Drawings

THERMOSETTING MATERIAL; PROCESS AND APPARATUS FOR FORMING THERMOSETTING MATERIAL

This application is the US national phase of international application PCT/NL2004/000384 filed 27 May 2004 which designated the U.S. and claims benefit of NL 1023563, dated 28 May 2003, the entire content of which is hereby incorporated by reference.

The invention relates to a process for forming an uncured, partially cured or cured thermosetting material. The invention also relates to an apparatus for forming a cured or uncured thermosetting material. The invention further relates to a thermosetting material.

A process for forming a cured or uncured thermosetting material is known, and is described in for example U.S. Pat. No. 3,730,828. The thermosetting material, a laminate containing a melamine-formaldehyde (MF) resin, is heated by infrared lamps to a temperature of approximately 325° F. (163° C.) and then formed. In known processes the reported temperature generally is determined on the basis of surface measurements for instance with the aid of melting chalk crayons or other techniques known to those skilled in the art.

The known process has the disadvantage that the heating technique requires much time. A heating time—to a temperature which, as is known, often lies between 160° C. and 190° C.—varying from tens of seconds for a thermosetting material of a few tenths of a millimeter thickness to many minutes for a thermosetting material of a few millimeters thickness is not unusual. As a result a number of unwanted side effects such as blistering, undesired curing, and degradation can occur. Due to the required time and due to the occurring side effects it is not often possible to achieve the. ideal forming temperature and it is necessary to make do with forming at a lower than ideal temperature, which in its turn entails a strongly increased risk of crack formation and/or fracture during or after forming. Furthermore, in the known process it is often necessary to use thermosetting materials which have cured to a lesser degree than desirable, as viewed from the requirements specified for the end products, because the forming step cannot otherwise be completed without crack formation or even fracture. Also, in the known process it is often necessary to add plasticisers to the thermosetting material, because the forming step cannot otherwise be completed without crack formation or even fracture; however, adding a plasticiser to the thermosetting material often leads to deterioration of various properties in the end product such as reduced scratch resistance and/or reduced chemical resistance.

It is the object of the invention to largely avoid the said disadvantages.

The said object is achieved in that the process comprises:
  an irradiation step wherein the thermosetting material is exposed in such a way to electromagnetic radiation which to a significant extent is within the near-infrared range that the temperature of the irradiated thermosetting material is brought to between 40° C. and 400° C.; and
  a forming step wherein the irradiated thermosetting material is brought into a desired shape,
whereby the forming step is executed during and/or subsequent to the irradiation step.

The advantage of the process according to the invention is that radiation within the near-infrared range ensures much faster, through-and-through heating of the thermosetting material than in the known case of heating by for example regular infrared radiation. Due to this faster heating the most optimal temperature for the forming step can be reached, while the risk of unwanted side effects such as blistering is minimised by the short time required for the irradiation step and forming step. It is a further advantage of the process according to the invention that the amount of reject material of the thermosetting material-containing end products due to the occurrence of unwanted side effects can be reduced in comparison with the known process.

The process according to the invention is applied to a thermosetting material. Thermosetting materials are known per se. A known characteristic of a thermosetting material is that it is cured so as to obtain it in the form in which it is ultimately used. As is known, a thermosetting material, once completely cured, can no longer be turned into molten form without degrading it on a molecular scale. When a thermosetting material has been cured partially, almost completely or completely, some forming, such as forming in the forming step according to the invention, is still possible, usually with the aid of a heating step. As is known, to this end it is generally recommended to heat the thermosetting material beyond the glass transition temperature ($T_g$). The thermosetting materials which can be used in the process according to the invention preferably. contain —OH, —NH, and/or —SH-comprising compounds; more preferably the thermosetting material comprises a phenol resin and/or an aminoplast resin. A thermosetting material may in practice contain several compounds, such as a combination of a phenol resin and an aminoplast resin, for example in separate layers. The thermosetting material contains with particular preference an aminoplast resin. Examples of aminoplast resins are a melamine-formaldehyde resin (MF), a urea-formaldehyde resin (UF) and a melamine-urea-formaldehyde resin (MUF). The thermosetting material used in the process according to the invention may contain a filler; this is a substance which does not significantly contribute to the curing process, but is usually intended to impart other specific properties such as strength or surface texture. Such fillers are known per se and include paper as a filler in a laminate; wood chips as a filler in a chipboard. The thermosetting material according to the invention can also be a layer on a substrate; an example of such an application known per se is a coating on a metal or plastic substrate. The substrate can be a cured or uncured thermosetting material, but the substrate can, as indicated, also be another material such as a metal or a thermoplastic.

The thermosetting material which is used in the process according to the invention has or has not been cured; it is not necessary that the curing has already taken place, it may be, however, that this has already taken place partly or even entirely or almost entirely. Preferably the thermosetting material has already been cured at least partially. The advantage of this is that the material to some extent already possesses the mechanical properties of the end product, such as rigidity, so that the material is easier to handle. More preferably the thermosetting material has already been completely or almost completely cured. The degree of curing of the thermosetting material may be derived from DSC or, preferably, TMDSC measurements. (TM)DSC stands for the known technique of (Thermally Modulated) Differential Scanning Calorimetry. For known thermosetting materials, the skilled person knows the peak in the TMDSC curve that is attributable to curing. For the said thermosetting material, the temperature at which the forming step takes place is also known. As reference, the TMDSC curve of the thermosetting material in non-cured state is determined. From this curve, the peak attributable to curing is determined; from this peak, the curing enthalpy ($\Delta H$) up to the temperature at which forming takes place is then calculated. The thus determined $\Delta H$ value is defined as a 0% degree of curing. A fully cured thermosetting material will show—up to the forming temperature—no peak attributable to curing, thus a ΔH value of 0; this is defined as a 100% degree of curing. Intermediate ΔH values are easily re-calculated into—and are hereby defined as—intermediate percentages of curing. Preferably, the thermosetting material has—as it enters the process according to the invention been cured at least 40% or 50%; more preferably, the thermosetting material has been cured at least 60% or 70%; most preferably, the thermosetting material has been cured at least 80% or 90%. It may be beneficial to ensure that the thermosetting material has not been cured 100%, but rather only 98%, or preferably only 95%; this has the advantage that the thermosetting material can be formed into more extreme shapes during the forming step according to the invention.

The thermosetting material is exposed in the irradiation step of the process according to the invention to radiation that lies to a significant extent within the near-infrared range. "To a significant extent" in the framework of this invention means that near-infrared radiation is the largest, largest but one or the largest but two part of the electromagnetic radiation expressed in energy per surface area, that is directed at the thermosetting material. Radiation within the near-infrared range refers to radiation with a wavelength of between 0.8 μm and 1.5 μm. This type of radiation typically causes heating but not photo-curing (i.e. curing as a result of the direct breaking of atomic bonds through photons). Preferably at least 10% of the electromagnetic radiation, expressed in energy per surface area, aimed at the thermosetting material is within the near-infrared range. More preferably at least 15% or 20% of the electromagnetic radiation aimed at the thermosetting material is within the near-infrared range. The advantage of this is that the unwanted side effects such as blistering have little opportunity to develop due to the speed with which the process according to the invention can be carried out. Still more preferably at least 30% or 40%, with special preference at least 45% or 50% and most preferably at least 55%, 60% or even at least 70% or 75% of the electromagnetic radiation aimed at the thermosetting material is within the near-infrared range. In order to ensure fast heating to the desired temperature it is preferable to direct at least 1 or 5 kW/m$^2$, or even 10 kW/m$^2$ of electromagnetic radiation at the thermosetting material. This also has the advantage that, as a consequence of rapid heating, a wider operating window is formed: the thermosetting material can be heated up within a larger temperature range than with the known process, without too many unwanted side effects ocurring. More preferably at least 30 or 50 kW/m$^2$, with special preference at least 100 or 200 kW/m$^2$, and most preferably at least 400 or 800 kW/m$^2$ of electromagnetic radiation is aimed at the thermosetting material. On account of the high effectiveness of near-infrared radiation in the process according to the invention it is preferable to aim at most 10000 or 9000, more preferably at most 8000 or 6000, and most preferably at most 5000 kW/m$^2$ of electromagnetic radiation at the thermosetting material.

The thermosetting material will heat up as a result of exposure to near-infrared radiation. In the process according to the invention the thermosetting material is brought to a temperature of between 40° C. and 400° C. It has been found that the heating of the thermosetting material by near-infrared radiation is very effective because near-infrared radiation penetrates very deep into the thermosetting material. As a consequence, the temperatures mentioned herein can be determined in the same way as in the known process referred to, that is, with the aid of surface measurements, but the average temperature in the thermosetting material in the process according to the invention will be higher at the same surface temperature than when known heating techniques are employed. It is an advantage of the process according to the invention that the thermosetting material heats up more homogeneously than with the application of known heating techniques such as standard infrared irradiation. A temperature of at least 40° C. is generally necessary to be able to apply the forming step according to the invention to the thermosetting material. With increasing temperature it is becomes increasingly easy to apply the forming step according to the invention. An additional advantage of heating the thermosetting material with near-infrared radiation to a higher temperature than 40° C. can also be that any further or residual curing can also be initiated. The optimal temperature to which the thermosetting material is heated depends in part on the specific composition of the material; these temperatures are usually known or can be determined by means of simple experiments. If the thermosetting material is heated to a very high temperature, undesired effects such as degradation can occur. In particular a temperature above 400° C. is not recommendable because very fast degradation of the thermosetting material then occurs. Preferably the thermosetting material is heated to at least 100° C. or 140° C., more preferably to at least 150° C. or 170° C., most preferably to at least 180° C. or even 190° C. Preferably the thermosetting material is heated to at most 350° C. or 300° C., more preferably to at most 250° C., most preferably to at most 220° C. If the $T_g$ of the thermosetting material is known, it is recommended to heat the thermosetting material to at least 10° C. or 20° C. above $T_g$, preferably at least 30° C. or even 50° C. above $T_g$, more preferably at least 75° C. or 100° C. above $T_g$, while remaining at or below 400° C. If the thermosetting material comprises an aminoplast resin, it will usually be necessary to heat to a temperature of between 100° C. and 220° C., preferably between 160° C. and 190° C.

As a consequence of the large penetration depth of near-infrared radiation as used in the process according to the invention, the thermosetting material can have a large thickness with heating yet taking place much more uniformly across the thickness than with known heating techniques such as standard infrared radiation. Preferably the thermosetting material has a thickness of at most 30 or 25 mm, more preferably at most 20 mm or 10 mm, still more preferably at most 8 mm, with special preference at most 6 mm and most preferably at most 5 mm. For relatively thick thermosetting materials, for example with a thickness of 6 mm to 25 or 30 mm, it can be advantageous to irradiate the thermosetting material in the irradiation step from several sides; for example, if the thermosetting material is flat or almost flat, from the top and the underside. It can also be advantageous to irradiate from one side and at the same time to position a material that reflects near infrared radiation, such as a metal, in such a way that that non-absorbed radiation is reflected so that the reflected radiation once again penetrates the thermosetting material. In a special preferred embodiment the thermosetting material consists of at least 2 layers and is characterised in that at least one layer is a reflective layer; this means that the reflective layer comprises a material that reflects near-infrared radiation. The invention therefore relates also to a thermosetting material that contains a reflective material. Examples of such reflective materials are metals such as aluminium. The reflective material can be present as a continuous phase in the reflective layer; the reflective material can also be present in the form of dispersed reflective particles. The reflective layer can be the surface layer on one side of the thermosetting material, with the electromagnetic radiation being directed at the thermosetting material from for example another side. Preferably the thermosetting material comprises at least 3 layers and the reflective layer is not on the surface of the thermosetting material; more preferably the thermosetting material comprises at least 4 layers with the reflective layer substantially or entirely in the middle of the thermosetting material. The advantage of this is that if the thermosetting material is irradiated from several sides, the heating takes place evenly; also it is possible to effectively treat in the irradiation step relatively thick thermosetting materials with a total thickness of for example 15 mm or 20 mm or more.

The thermosetting material will usually have a thickness of at least 25 µm, preferably at least 0.1 mm, more preferably at least 0.5 mm. If the thermosetting material is used in the process according to the invention in the form of a laminate, the thickness will usually be between 0.6 and 1.2 mm, since such thicknesses commonly occur in practice.

As a consequence of the effective, deeply penetrating heating effect of the near-infrared radiation, the irradiation step can usually be carried out faster than known irradiation steps. Preferably the thermosetting material is irradiated for 0.01 to 60 seconds; more preferably for 0.1 to 30 seconds; still more preferably for 0.5 to 20 seconds, most preferably for 1 to 10 seconds.

In a preferred embodiment of the process according to the invention the temperature of the thermosetting material is measured at a high frequency, for example a few tens of times or even a few hundreds to thousands of times per second. The duration of the irradiation step can be determined in this embodiment by means of a feedback circuit: in this way it is possible to terminate the irradiation step the moment a predetermined temperature, being an aforementioned temperature to which the thermosetting material must be heated, is reached. Preferably this embodiment is automated with the aid of the said temperature measurement and feedback circuit.

During or upon completion of the irradiation step in the process according to the invention a forming step is applied wherein the irradiated thermosetting material is brought into a desired shape. Such a forming step is known per se to those skilled in the art. Forming can take place along one axis, also known as 2D forming. Forming can also take place along two intersecting axes, also known as 3D forming. The degree of forming is dependent on the desired shape of the end product and on the maximum possible amount of forming allowed by the thermosetting material. In the forming process it is in general important to prevent the thermosetting material from cracking or fracturing. This can happen if the thermosetting material is excessively deformed, that is, into the arc of a circle with too small a diameter. In this connection it holds that 3D forming is more difficult to accomplish, which means it sooner leads to crack formation or fracture than 2D forming. It holds in general that a higher temperature of the thermosetting material, in particular a temperature higher than the $T_g$, makes a higher degree of forming possible during the forming step. The process according to the invention has the advantage that, due to rapid heating of the thermosetting material which makes it possible to heat to a higher temperature than when use is made of known heating processes such as standard infrared radiation so that unwanted side effects such as blistering are partially or entirely avoided, a higher degree of forming is possible than with the known process. The thermosetting material can, in the process according to the invention and at the temperature optimal for the material, usually be formed into the arc of a circle having a radius of at most 3 cm, preferably at most 2, more preferably at most 1 or 0.8 and most preferably 0.6 cm or even 0.4 cm without the thermosetting material crack formation or breaking. It holds here also that the maximum degree of forming to be achieved must be seen as a function of the thickness of the thermosetting material, where it generally holds that the thicker the material, the more limited the forming possibilities. By way of indication, the forming step according to the invention can be practised to form the arc of a circle with a radius that is 10 times or a higher multiple of the thickness of the thermosetting material, preferably 8 times or a higher multiple, more preferably 6 times or a higher multiple and most preferably 5 times or a higher multiple.

The forming step according to the invention can be executed upon completion of the irradiation step. In a preferred embodiment of the process according to the invention, the forming step is done at least partly during the irradiation step: the thermosetting material is thus heated or further heated while it is being brought into the desired shape. This method of operation is enabled by the quick and through-and through heating effect of the near-infrared radiation. The advantage of this embodiment is that the process according to the invention can be executed much quicker than when the irradiation step and the deformation step are executed subsequently; another advantage of this embodiment according to the invention is that a much more precise amount of irradiation can be administered, namely only so much as is needed— at the moment when it is needed, thereby ensuring an even further reduction of undesired side effects occurring in the thermosetting material can be achieved; a yet further advantage of this embodiment is that any curing or further curing of the thermosetting material is postponed as much as possible to after the forming step has been executed, since the forming is done as the heating takes place.

As is known to the skilled person, a certain amount of force (deformation force) is exerted during the forming step in order to achieve the end result, i.e. bring the thermosetting material into its predetermined desired shape. For thermosetting materials, the said deformation force will typically decrease with increasing temperature of the thermosetting material. The said deformation force should remain within certain limits: a very high deformation force indicates a shift towards an unfavourable deformation mechanism, leading to cracks in, or breakage of the thermosetting material. A very low deformation force, on the other hand, indicates that the temperature of the thermosetting material is higher than necessary, thus leading to waste of energy and promotion of unwanted side effects. The precise limits beyond which a deformation force should be considered as being too high or too low will, as the skilled person will appreciate, depend on parameters such as the thickness and properties of the thermosetting material itself; as an approximation, these limits can be considered to be the same as in case of a deformation step which is done with a pre-heated thermosetting material, whether or not said pre-heating was done according to the invention. In any case, a deformation force accompanied by crack formation in the thermosetting material is typically considered to be too high; on the other hand, a deformation force accompanied by unwanted side effects such as degradation is typically considered to be too low.

Preferably, the apparatus in which the forming step is being done at least partly during the irradiation step is equipped in such a fashion that an indication or a measurement of the said deformation force is provided. If the indication or measurement shows that the deformation force as needed in order to achieve the predetermined desired deformation is too high, then the amount of near-infrared irradiation to which the thermosetting material is exposed should be increased. On the other hand, if the indication or measurement shows that the deformation force as needed is too low, then, by the same principle, the amount of near-infrared irradiation to which the thermosetting material is exposed should be decreased. Preferably, the deformation force measurement and subsequent adjustment of the amount of irradiation is automated.

If the thermosetting material is to be a layer on a substrate, it can be advantageous or necessary to carry out the forming step only for the thermosetting material to ensure that the thermosetting material conforms to the shape of the substrate.

It is possible to carry out the irradiation step for the thermosetting material as a whole. This is advantageous because it is much more difficult with the known processes to heat a large surface area, for example 0.5 to 2 $m^2$ without unwanted side effects occurring. The process according to the invention thus enables 3D forming of large moulded articles of thermosetting materials, such as chairs or other pieces of furniture.

In another preferred embodiment of the process according to the invention the irradiation step is only applied to a part of the thermosetting material, namely only the part to be formed in the forming step. The advantage of this is that there is no way of unwanted side heating effects, such as blistering or degradation, occurring in unirradiated parts. A further advantage of the preferred embodiment is that the irradiated part of the thermosetting material will cool down faster after the forming step, since heat can then be dissipated to the non-heated parts, which reduces still further the probability of unwanted side heating effects in the irradiated part. Irradiating only a part of the thermosetting material can be accomplished by means of a technique known per se; it is possible, for example, to place a mask, fashioned from a material that screens or reflects electromagnetic radiation, such as a metal, between the near-infrared source and the thermosetting material.

If the process according to the invention is done on an uncured or partially cured thermosetting material, then the heating of the thermosetting material to a temperature lying between 40° C. and 400° C. may, as a beneficial side effect, lead to a partial or even complete curing of the thermosetting material. If however there was no curing or partial curing, it may be advantageous to execute, subsequent to the forming step, a post-curing step wherein the thermosetting material is exposed to electromagnetic radiation which to a significant extent is within the near-infrared range in such a way that the temperature of the irradiated thermosetting material is brought to or maintained at a temperature lying between 40° C. and 400° C. The advantage of post-curing the thermosetting material is that a higher degree of curing usually leads to improved properties of the thermosetting material, such as thermal- and chemical resistance and mechanical properties.

During and/or after completion of the forming step or the post-curing step according to the invention, a cooling step can be carried out. The aim of the cooling step is to cool the thermosetting material rapidly; this has the advantage that the aforementioned unwanted side effects are limited still further. The cooling step can be carried out by means of processes known per se to those skilled in the art, such as through forced air cooling or through direct contact between a cooling element and the thermosetting material.

The invention also relates to an apparatus for forming a thermosetting material. The apparatus according to the invention is suitable for practising the above-mentioned process. The apparatus comprises means known per se for forming the thermosetting material. The apparatus also comprises means of irradiating the thermosetting material with electromagnetic radiation which to a significant extent is within the near-infrared range. Such means are, albeit for a different application, known per se to those skilled in the art.

An apparatus according to the invention can be based on an apparatus which is known from European standard EN 438-2 (1991) and described in chapter 21 'Formability (Process B)' and FIG. 22 of this standard, whereby the radiation source described in the above-mentioned standard must be replaced by a radiation source which emits radiation which to a significant extent is within the near-infrared range; such radiation sources are known per se and are produced by for example AdPhos®. Preferably, the apparatus according to the invention comprises means to irradiate the thermosetting material during the forming thereof, said irradiation being done with electromagnetic radiation which to a significant extent is within the near-infrared range. With this apparatus, embodiments of the process according to the invention where the forming step is executed partly or wholly simultaneously with the irradiation step can be implemented. Preferably, the said apparatus comprises means to measure the deformation force as executed on the thermosetting material in order to obtain the desired degree of forming, and means to adjust the amount of irradiation to which the thermosetting material is exposed during forming as function of the deformation force.

In addition to an apparatus which is suitable for carrying out the said radiation step and forming step, the invention also relates to optimising an existing apparatus for heating and/or forming a thermosetting material wherein the optimisation comprises adding a radiation source which emits electromagnetic radiation which to a significant extent is within the near-infrared range. Addition of the near-infrared radiation source allows the advantages of the invention, such as accelerated and/or localized heating and the achievement of higher temperatures in the thermosetting material, to be achieved without a completely new apparatus needing to be made.

The present invention will be illustrated by means of Examples and comparative Experiments.

EXAMPLE 1

A flat piece of HPL (high-pressure laminate) consisting of core layers and surface layers was heated by means of irradiation. The HPL as chosen is suitable for so-called post-forming, i.e. a forming step subsequent to the preparation of the HPL; this indicates that the laminate was not fully cured. The core layers consisted of natron kraft paper, impregnated with commercially available phenol-formaldehyde resin. The surface layers consisted of white paper, impregnated with a commercially available melamine-formaldehyde resin. As is known, both phenol-formaldehyde resins and melamine-formaldehyde resins as used in practice comprise additives.

The total thickness of the laminate was 0.8 mm. The irradiation source was a near-infrared (NIR) lamp (supplier: Adphos); about 50% of its radiation falls within the NIR range. The laminate was heated with an intensity of 250 $kW/m^2$ (total), from room temperature to a temperature between 160° C. and 190° C.—this being the operating window of the post-forming step for this type of laminate—within 4 seconds. After heating, the laminate could be successfully 2D-formed. Forming was done to the arc of a circle having an 8 mm radius. No cracking or degradation was observed.

Comparative Experiment A

The same HPL laminate as in Example 1 was heated from room temperature to a temperature between 160° C. and 190° C.; however, use was made of a lamp emitting regular infrared radiation. The irradiation step took 30 seconds; only then could the laminate be formed.

EXAMPLE 2

An HPL laminate having the same structure as in Example 1 but having a total thickness of 4 mm was subjected to the same irradiation step as in Example 1. The temperature at the surface was measured, as usual. Additionally, the temperature in the core of the laminate was also measured; this could be achieved through the incorporation of a thermocouple inside the laminate during the process of preparing the HPL. After 18 seconds, the core had reached the post-forming temperature of 160° C.; at that moment, the surface temperature was 180° C. After heating, the laminate could be successfully 2D-formed. Forming was done to the arc of a circle having a 40 mm radius. No cracking or degradation was observed.

Comparative Experiment B

The same 4 mm HPL laminate as in Example 2 was heated; however, use was made of a lamp emitting regular infrared radiation. The irradiation step took 3 minutes; only then had the core reached 160° C. At that moment, however, serious degradation of the surface had occurred. This rendered the laminate unsuitable for further use. The experiment was stopped.

EXAMPLE 3

Example 2 was repeated with an HPL laminate of 8 mm thickness. In this experiment, the near-infrared radiation was not continuous but pulsating in order to avoid overheating of the surface. After 2 minutes, the core had reached 160° C., starting from room temperature; the surface temperature was between 190-200° C.

Comparative Experiment C

The same 8 mm HPL laminate as in Example 3 was heated, with the objective of increasing the temperature from room temperature to a temperature between 160° C. and 190° C.; however, use was made of a lamp emitting regular infrared radiation. After 4.5 minute, the core had reached 150° C.; prolonged irradiation, however, did not result in an increase of core temperature to 160° C. or above. The experiment was therefore stopped.

From the Examples 1-3 and Comparative Experiments A-C, it clearly follows that the use of near-infrared radiation allows faster and more in-depth heating of a laminate than regular infrared radiation, thereby enabling a quicker and better forming process, even when regular heating sources are not able to successfully heat the laminate (e.g. at higher thicknesses).

EXAMPLE 4-7

Comparative Experiment D

The HPL laminate of Example 1 was subjected to a post-curing step by irradiation with NIR lamps (supplier: Adphos); about 50% of its radiation falls within the NIR range. The laminate was heated with an intensity of 250 kW/m$^2$ (total). The degree of additional curing in the core and in the surface layer was determined as function of irradiation time, by means of a TMDSC measurement. TMDSC stands for the known technique of Thermally Modulated Differential Scanning Calorimetry; this technique enables the skilled person to distinguish reversible processes (such as attributable to a $T_g$ transition) from non-reversible processes such as the curing of a thermosetting material. The peak attributable to curing could be identified with additional certainty since it is known from this type of laminates that curing takes place at temperatures lying between about 120° C. and about 180° C. In the measurements of this Example, the samples were placed in a closed high-pressure re-usable stainless steel sample holder so as to prevent the loss of any water vapour as generated during the curing. Heating rate was 2.5° C. per minute; the temperature modulation had an amplitude of 0.5° C. and a period of 90 seconds. The degree of additional curing was defined as 0% for the sample that had not been exposed to any post-curing step (Comparative Experiment D). A 100% additional curing score was awarded if the TMDSC curve showed no peak at all that could be attributed to curing. Intermediate scores are arrived at by first measuring the curing enthalpy ($\Delta H$) in the Example, expressing this curing enthalpy as a percentage of the curing enthalpy of Comparative Experiment D, and subtracting the said percentage from 100%. The results are summarized in the table:

| Example/Experiment | Irradiation time (seconds) | Degree of additional cure (%) - core | Degree of additional cure (%) - surface |
|---|---|---|---|
| D | 0 | 0 | 0 |
| 4 | 0.5 | 20 | 77 |
| 5 | 1 | 27 | 85 |
| 6 | 2.5 | 82 | 100 |
| 7 | 4 | 100 | 100 |

Examples 4-7 clearly show that a post-curing step can be done successfully by means of the use of near-infrared radiation. The difference in percentages between core and surface are primarily attributed to the known fact that phenolic resins—i.e. the resins in the core—cure at a slower pace than the melamine-formaldehyde resins as present in the surface.

The invention claimed is:

1. Process for forming a shaped multilayer laminate comprising:
    (a) providing a rigid multilayer laminate preform having at least one layer comprised of a partially cured thermosetting phenol and/or aminoplast resin;
    (b) positioning a mask which screens or reflects electromagnetic radiation between the preform and a source of electromagnetic radiation having a wavelength in a near infrared radiation range of between 0.8 µm to 1.5 µm so that at least one portion of the preform is exposed to the electromagnetic radiation;
    (c) subjecting the at least one exposed portion of the preform to the electromagnetic radiation for a time between 0.1 to 30 seconds and thereby heat the at least one exposed portion of the preform to an elevated temperature of between 40° C. and 250° C. sufficient to allow the at least one exposed portion of the heated preform to be shaped and to postpone further curing of the thermosetting resin; and
    (d) simultaneously with or subsequently to step (c), forming the at least one exposed portion of the heated preform into a desired shape so as to form the shaped multilayer laminate.

2. Process according to claim 1, wherein the multilayer laminate preform comprises a substrate, and a layer comprising the thermosetting resin on the substrate.

3. Process according to claim 1, wherein the electromagnetic radiation has an intensity between 100 and 8000 kW/m$^2$.

4. Process according to claim 1, wherein step (c) comprises heating the multilayer laminate preform to an elevated temperature of between 100° C. and 250° C.

5. Process according to claim 1, wherein the multilayer laminate preform has a thickness of at most 30 mm.

6. Process according to claim 5, wherein at least one layer of the multilayer laminate preform comprises a reflective material.

7. Process according to claim 5, wherein step (c) includes exposing the multilayer laminate preform from several sides to the electromagnetic radiation.

8. Process according to claim 1, further comprising measuring the elevated temperature of the heated preform, and terminating exposure of the preform to the electromagnetic radiation in response to the elevated temperature reaching a desired temperature.

9. Process according to claim 1, wherein step (d) includes forming the at least one exposed portion of the heated preform into a 2D or 3D shape.

10. Process according to claim 1, wherein step (d) includes forming the at least one exposed portion of the heated preform into an arc of a circle with a radius of at most 3 cm without the cracking or fracturing the preform.

11. Process according to claim 1, further comprising subjecting the shaped multilayer laminate to a post-curing step, subsequent to the forming step (d), wherein the post-curing step includes exposing the shaped multilayer laminate to a subsequent dose of electromagnetic radiation having a wavelength in a near infrared radiation range of between 0.8 μm to 1.5 μm for a time sufficient to elevate the temperature of the shaped multilayer laminate to between 40° C. and 400° C. and thereby effect further curing of the thermosetting resin.

12. The process according to claim 1, wherein the multilayer laminate preform comprises multiple paper layers, wherein each of the paper layers is impregnated with the partially cured thermosetting phenol and/or aminoplast resin.

13. The process according to claim 1, wherein the multilayer laminate preform comprises multiple paper layers, and wherein at least one of the paper layers is impregnated with the partially cured thermosetting phenol resin, and wherein at least one other layer is impregnated with the partially cured thermosetting aminoplast resin.

14. The process according to claim 1, wherein the multilayer laminate preform comprises core layers and surface layers, and wherein the core layers are comprised of a paper impregnated with the partially cured thermosetting phenol resin, and wherein the surface layers are comprised of a paper impregnated with the partially cured thermosetting aminoplast resin.

15. Process for forming a shaped portion of a multilayer laminate comprising:
(a) providing a rigid multilayer laminate preform having at least one layer comprised of a partially cured thermosetting phenol and/or aminoplast resin;
(b) positioning a mask which screens or reflects electromagnetic radiation between the preform and a source of electromagnetic radiation having a wavelength in a near infrared radiation range of between 0.8 μm to 1.5 μm so that at least one part of the preform is exposed to the electromagnetic radiation;
(c) subjecting the at least one exposed of the preform to the electromagnetic radiation for a time between 0.1 to 30 seconds and thereby heat the at least one exposed part of the preform to an elevated temperature of between 40° C. and 250° C. sufficient to allow the heated at least one exposed part of the preform to be shaped and to postpone further curing of the thermosetting resin;
(d) simultaneously with or subsequently to step (c), forming the heated at least one exposed part of the preform into a desired shape so as to form the shaped portion of the multilayer laminate, and thereafter
(e) exposing an entirety of the multilayer laminate preform shaped according to step (d) to a subsequent dose of electromagnetic radiation to thereby effect further curing the thermosetting resin.

16. The process according to claim 15, wherein the multilayer laminate preform comprises multiple paper layers, wherein each of the paper layers is impregnated with the partially cured thermosetting phenol and/or aminoplast resin.

17. The process according to claim 16, wherein the multilayer laminate preform comprises multiple paper layers, and wherein at least one of the paper layers is impregnated with the partially cured thermosetting phenol resin, and wherein at least one other layer is impregnated with the partially cured thermosetting aminoplast resin.

18. The process according to claim 17, wherein the multilayer laminate preform comprises core layers and surface layers, and wherein the core layers are comprised of a paper impregnated with the partially cured thermosetting phenol resin, and wherein the surface layers are comprised of a paper impregnated with the partially cured thermosetting aminoplast resin.

19. Process according to claim 15, wherein the multilayer laminate preform comprises a substrate, and a layer comprising the thermosetting resin applied on the substrate.

20. Process according to claim 15, wherein the electromagnetic radiation has an intensity between 100 and 8000 kW/m$^2$.

21. Process according to claim 15, wherein step (c) comprises heating the at least one exposed part of the multilayer laminate preform to an elevated temperature of between 100° C. and 250° C.

22. Process according to claim 15, wherein the multilayer laminate preform has a thickness of at most 30 mm.

23. Process according to claim 22, wherein at least one layer of the multilayer laminate preform comprises a reflective material.

24. Process according to claim 22, wherein step (b) includes exposing the part of the multilayer laminate preform from several sides to the electromagnetic radiation.

25. Process according to claim 15, further comprising measuring the elevated temperature of the heated part of the preform, and terminating exposure of the preform to the electromagnetic radiation in response to the elevated temperature reaching a desired temperature.

26. Process according to claim 15, wherein step (d) includes forming the heated at least one exposed part of the preform into a 2D or 3D shape.

27. Process according to claim 15, wherein step (d) includes forming the heated at least one exposed part of the preform into an arc of a circle with a radius of at most 3 cm without the cracking or fracturing the preform.

28. Process according to claim 15, wherein the electromagnetic radiation of step (e) has a wavelength in a near infrared radiation range of between 0.8 μm to 1.5 μm, and wherein the multilayer laminate preform shaped according to step (d) is exposed to the electromagnetic radiation for a time sufficient to elevate the temperature of the multilayer laminate to between 40° C. and 400° C.

* * * * *